United States Patent [19]

Gibert

[11] 4,448,069

[45] May 15, 1984

[54] AIRSPEED SENSING POST FOR DETERMINING RELATIVE VELOCITY OF A FLUID AND A CARRIER

[75] Inventor: Francis J. P. Gibert, Les Mesnuls, France

[73] Assignee: FGP Instrumentation, Les-Clayes-sous-Bois, France

[21] Appl. No.: 337,710

[22] Filed: Jan. 7, 1982

[30] Foreign Application Priority Data

Jan. 8, 1981 [FR] France .................................. 81 00186

[51] Int. Cl.³ ............................................. G01C 21/10
[52] U.S. Cl. .................................... 73/182; 73/861.65
[58] Field of Search ................ 73/182, 861.65, 861.66, 73/861.67, 861.68, 861.42

[56] References Cited

FOREIGN PATENT DOCUMENTS

| 699939 | 11/1953 | United Kingdom | 73/182 |
| 938081 | 9/1963 | United Kingdom | 73/861.65 |
| 1418970 | 12/1975 | United Kingdom | 73/182 |

*Primary Examiner*—Donald O. Woodiel
*Attorney, Agent, or Firm*—A. W. Breiner

[57] ABSTRACT

An airspeed sensing post includes a static pressure sensing device having such a revolutionary shape that when the incidence angle varies, the fluid flow arriving near said sensing device is always the same and along a surface having the same contour. Thus, the aerodynamic conditions are always the same when the direction of the fluid flow varies. So, no correction of measured static pressure is required in dependence of the pitch angle.

8 Claims, 5 Drawing Figures

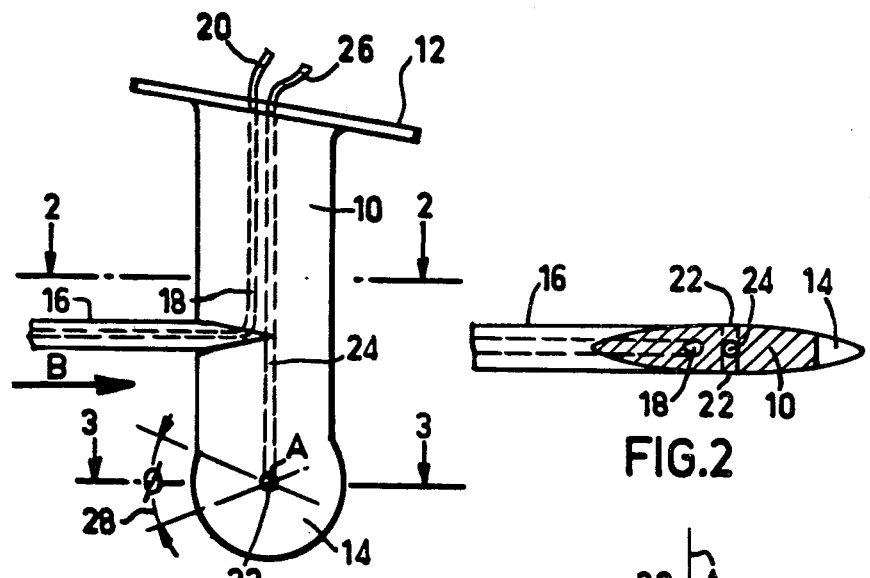
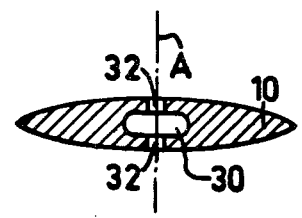
FIG. 2
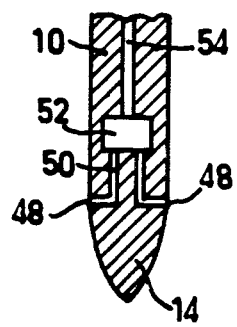
FIG. 3
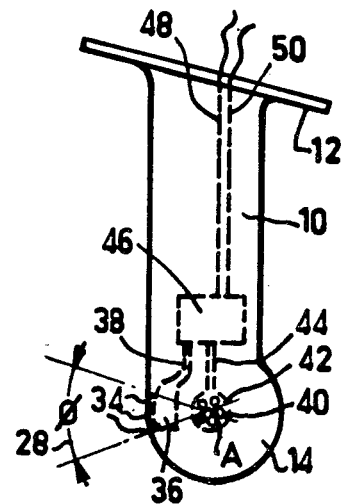

AIRSPEED SENSING POST FOR DETERMINING RELATIVE VELOCITY OF A FLUID AND A CARRIER

FIELD OF THE INVENTION

The present invention relates to an airspeed sensing post for determining relative velocity of a fluid and a carrier, along a direction which is variable, and especially relates to the measure of fluid flow velocity and especially the measure of aircraft speed.

BACKGROUND OF THE INVENTION

The speed of aircrafts is generally derived from the difference between a total or dynamic pressure and a static pressure of the aircraft's surrounding air. As air is a compressible fluid, velocity is determined with a relatively complex relation, including the square root of an expression including the difference between the total or dynamic pressure and the static pressure.

The static pressure is generally sensed by a tube length substantially parallel to the flow direction and having a wall with small drilled holes. The total pressure is measured with a Pitot probe, including a tube which has an internal diameter of some millimeters and ends at an orifice at the impact point of a fluid on the tube.

It has been found that the measured total pressure has a value which presents only small variations when the tube length constituting the Pitot probe is tilted relative to the flow velocity vector in a relatively small angle range of about ±20°.

On the contrary, it has been found that the measured static pressure is sometimes greatly erroneous. In fact, when a tube having by example eight small holes at its perimeter is tilted relative to the velocity vector of the flow in which it is disposed, some holes are more exposed than other ones to the fluid flow and transmit a part of the total pressure while other holes are in a slight depression. It has been found that, in the case of an aircraft, especially during take-off and landing, errors on static pressure can approach or exceed 100 mbar. These errors are especially detrimental because they are integrally incorporated in the pressure difference.

It is known that speed indications have a paramount importance during certain operations such as take-off and landings when the static pressure tapping tube is not in its nominal position.

PRIOR ART

To cope with the above difficulties, electronic circuits have been used behind the static pressure sensing device for the purpose of correcting measured values. However, the results are neither reliable nor quick as corrections the are executed empirically from other parameters whose measurement is not instantaneous.

Prior attempts for reducing the above difficulties of these pressure measurements included determining pressures as far as possible of the aircraft components which can cause disturbances. So, the corrections provided for depend only on the tilting of the velocity vector relative to the pressure tapping tube and can be determined more reliably. By example, prior attempts included mounting pressure tapping points at the end of a pole mounted in front of the aircraft, on the body nose. However, these arrangements introduce two main difficulties. First, as the section area of the pole is small, incorporating velocity computing and measuring circuits is difficult, and the sensed pressures are to be transmitted by tubes which have a great length. So, the system inertia is great and a measurement is displayed with a significant delay relative to the time of the pressure tapping. This solution is far from being satisfactory in the case of fast military aircraft, because said delay corresponds to a displacement of an important distance, by example several meters and even several tens of meters.

The second difficulty introduced by poles is that they cast a shadow on the radar usually incorporated in the aircraft.

So, even when a pole is used, measures are to be corrected in dependence with the relative tilting of the pole and the velocity vector.

British Pat. No. 1 418 970 discloses an apparatus for measuring the differential static pressure between the two sides of the yacht sail. Said apparatus includes two partly spherical cases disposed on the two sides of a sail and defining between whem two static pressure chambers divided by a diaphragm or a rigid wall and connected to separated chambers of a differential detector. One of the cases is for measuring windward static pressure and the other leeward static pressure. The drawings depict the apparatus with two partly spherical cases, but the specification discloses neither that said cases are spherical nor the advantages displayed by such a shape.

British Pat. No. 699 939 discloses an apparatus for measuring the speed of ships in water. It discloses a kind of sensing post having a static pressure tap and a dynamic pressure tap. The ship in which the post is mounted has pitch angles smaller than the pitch angles of an aircraft during its flight. The post has a cylindrical shape with a non circular section.

OBJECTS OF THE INVENTION

One object of the invention is to cope with drawbacks of the known devices, and especially to determine the relative velocity of a fluid and a carrier as an aircraft, without disturbance of the measured static pressure value by variation of the incidence angle of the fluid flowing along the post.

Another object of the invention is to provide an airspeed sensing post having small connection tubes and having a quick response.

Another object of the invention is to provide an airspeed sensing post having such a disposition so as not to cast a shadow on the airborne radar.

Another object of the invention is to provide an airspeed sensing post which is strong, reliable and simple.

SUMMARY OF THE INVENTION

An airspeed sensing post according to the invention includes a static pressure sensing device having such a revolutionary shape that when the incidence angle varies, the fluid flow arriving near said sensing device is always the same and along a surface having the same contour; so, the aerodynamic conditions are always the same when the direction of the fluid flow varies.

The invention relates to an airspeed sensing post for determining the relative velocity of a fluid and a carrier, in a direction which can vary in a substantially planar circle sector defined on both sides of a mean direction, from static pressure and total pressure values, said post including a body to be fixed to the carrier, a static pressure sensing device fixed to said body and for forming a first pressure signal, and a total pressure sensing device, fixed to said body, having an orifice opening in a direction substantially parallel to said mean drection and for forming a second pressure signal, said static pressure sensing device including at least one orifice made in a surface in which it opens in a direction substantially normal to said mean direction, said surface in which at least one orifice opening includes at least a part of revolutionary surface having a revolution axis normal to the plane of said circle sector, said revolution axis intercepting or being disposed very near to said orifice, said the revolution surface part having an angular extension at least equal to the angular extension of said circle sector, and said revolutionary surface part being disposed at least above the orifice in the flowing direction of the fluid, so that the fluid flow arriving near said orifice is always the same and the fluid flows along a surface having the same contour when the fluid flow direction varies in the circle sector.

Preferably, the static pressure sensing device has several orifices opening in the same chamber.

In another embodiment, the static pressure sensing device is double and has a configuration symmetrical about a longitudinal plane of said post.

The sole orifice or the several orifices of a first side and the sole orifice or the several orifices of the other side of the static pressure sensing device are preferably connected to different inputs of a device for forming a resulting static pressure signal. Said device for forming the resulting signal is preferably a plenum chamber.

The total pressure sensing device includes preferably several orifices opening in non parallel directions included in a circle sector having substantially the same extension as the circle sector in which the flowing fluid direction varies.

The post preferably includes conduits for transmitting pressure signals out of the post. In another embodiment, the post includes relative velocity determining means for receiving said first and second pressure signals and for forming a signal representative of said relative velocity.

BRIEF DESCRIPTION OF THE DRAWING

In the drawing:

FIG. 1 is a side elevation illustrating an airspeed sensing post according to the first embodiment of the invention FIG. 2 is a cross-sectional view of FIG. 1 along line 2—2;

FIG. 3 is a cross-sectional view along line 3—3 of a post according to a variant of the invention;

FIG. 4 is an elevation of an airspeed sensing post according to the second embodiment of the invention; and FIG. 5 is a transverse cross-sectional view of a variant of a post end according to the invention.

DETAILED DESCRIPTION OF THE BEST MODE

In the drawing, numeral 10 generally indicates an airspeed sensing post according to the invention, having a flange 12 for fixation on the body or a wing of an aircraft. Post 10 has a round end 14 including a static pressure sensing device. Said body also includes a tube 16 constituting a Pitot probe having an orifice opening substantially in the expected air flow direction, as shown by arrow B. Orifice sensed pressure is transmitted by an internal conduct 18 to an external conduct 20 to be connected to suitable velocity determining means.

The static pressure sensing device has an orifice 22 disposed substantially at the center of the end 14 and connected by an interior tube 24 to an exterior tube 26 connected at its turn to velocity determining means. According to the invention and as shown by FIG. 3 which corresponds to a variant described in the following, the surface in which orifice 22 opens is a revolutionary surface having a revolution axis A, at least in the circle sector 28 overlapping an angle $\phi$. Preferably, end 14 surface is of revolutionary not only in the upstream part of circle sector 28 but also in the downstream part, at least over some distance.

So, when the direction of the fluid flow, i.e., in the direction of its velocity vector, is parallel to a direction included in sector 28, the air arriving at orifice 22 has always flowed along a surface having the same contour and the same distance. Accordingly, the air flow is subjected to the same aerodynamic effect up to the orifice no matter what the velocity vector direction is in the circle sector 28. So, the measured static pressure does not vary with incidence angle.

FIG. 2 shows a body 10 having an aerodynamic streamlined shape, exercising a resistance to air flow as small as possible. FIG. 3 shows an end 14 having substantially the shape of a biconvex lens having a radius of 20 to 100 mm by example.

FIG. 2 shows that in fact a static pressure sensing device has two orifices 22 opening through the two faces of the sensing device which is symmetrical about a plane including its velocity vector.

In the FIG. 3 variant, the two static pressure tapping orifices 32 directly open in an interior chamber 30.

FIG. 4 shows a variant of an airspeed sensing post according to the invention. In this figure, reference also used in FIG. 1 relate to similar members. So, a body 10 has a fixation flange 12 and an end 14. However, the total pressure tapping tube 16 is replaced by a pressure sensitive device having several orifices 34 in the leading edge of end 14. These orifices are constituted so as to open in diverging directions which are also included in circle sector 28. So, an orifice 34 is substantially normal to the fluid flow direction whatever the tilting of the airspeed sensing post. Orifices 34 open in a chamber 36 connected by a conduct 38 to means 46 disclosed in more detail in the following. Several static pressure tapping orifices 40 arranged near and about revolution axis A open in an interior chamber 42 connected by conduct 44 to means 46. In a variant, a conduct is connected to each orifice and to means 46.

Means 46 which receive total and static pressure signals include sensors and electronic means for directly computing velocity and transmit it by a line 48, and receive power by a line 50. So, in the considered embodiment, physical fixation of post 10, by example on an aircraft body, and connection of lines 48 and 50 are sufficient for the system to be automatically operational.

In a variant, sensors disposed at the level of orifices directly generate electrical signals corresponding to pressure. Signals are transmitted to velocity computing means arranged in said post or outside of said post.

FIG. 5 shows a variant in which two static pressure tapping orifices 48 are connected by conducts 50 to a plenum chamber 52. The resulting static pressure signal is transmitted by a conduct 54 to suitable using means. In a variant, chamber 52 has a suitable configuration so that it provides for weighting pressures according to a suitable ratio, in the place of pressure equalization.

Obviously, the airspeed sensing post includes if necessary deicing means, well known in the art, when such a feature is required.

So, the invention relates to an airspeed sensing post having no movable member, so that a quite simple maintenance is enough. The results given are reliable, in spite of incidence angle variations of the fluid flow whose velocity is measured.

It has been experimentally found that measured velocity values are true and accurate during take-off and landings, even without correction. However, some correction may be used according to the shape factor of end 14. However, it is to be stressed that this correction factor does not vary with the incidence angle, so that correction may be provided for reliably and reproducibly by simple circuits.

I claim:

1. An airspeed sensing post for determining the relative velocity of a fluid and a carrier, in a direction which can vary in a substantially planar circle sector defined on both sides of a mean direction, from static pressure and total pressure values, said post including
   a body to be fixed to the carrier,
   a static pressure sensing device fixed to said body and forming a first pressure signal, and
   a total pressure sensing device, fixed to said body, having an orifice opening in a direction substantially parallel to said mean direction and for forming a second pressure signal,
   said static pressure sensing device including at least one orifice made in a surface in which it opens in a direction substantially normal to said mean direction,
   said surface in which at least one orifice opening includes at least a part of a revolutionary surface having a revolution axis normal to the plane of said circle sector,
   said revolution axis intercepting or being disposed very near to said orifice,
   said revolutionary surface part having an angular extension at least equal to the angular extension of said circle sector, and
   said revolutionary surface part being disposed at least above the orifice in the flowing direction of the fluid, so that the fluid flow arriving near said orifice is always the same and the fluid flows along a surface having the same contour when the fluid flow direction varies in the circle sector.

2. A post according to claim 1, wherein the static pressure sensing device has several orifices opening in one chamber.

3. A post according to claim 1 or 2, wherein the static pressure sensing device is double and has a configuration symmetrical about a longitudinal plane of said post.

4. A post according to claim 3, wherein the orifice or orifices of a first side and the orifice or orifices of the other side of the static pressure sensing device are connected to different inputs of means for forming a resulting static pressure signal.

5. A post according to claim 4, wherein said means for forming a resulting static pressure signal is a plenum chamber.

6. A post according to claim 1, wherein the total pressure sensing device has several orifices opening in non parallel directions included in a circle sector having substantially the same extension as the circle sector in which the fluid flow direction varies.

7. A post according to claim 1, further including conducts for transmitting said pressure signals out of said post.

8. A post according to claim 1, further including relative velocity determining means for receiving said first and second pressure signals and for formng a signal representative of said relative velocity.

* * * * *